United States Patent [19]

Orlandi

[11] Patent Number: 4,994,135

[45] Date of Patent: Feb. 19, 1991

[54] DEVICE FOR ROTATION OF THE PEDESTALS SUPPORTING BOTTLES, OR CONTAINERS IN GENERAL, IN ROTARY LABELING MACHINES

[75] Inventor: Ireneo Orlandi, San Giorgio di Mantova, Italy

[73] Assignee: Alfa Costruzioni Meccaniche S.P.A., Mantova, Italy

[21] Appl. No.: 360,821

[22] Filed: Jun. 2, 1989

[30] Foreign Application Priority Data

Jun. 3, 1988 [IT] Italy .............................. 40088 A/88

[51] Int. Cl.[5] .............................................. B32B 31/00

[52] U.S. Cl. .................................... 156/362; 156/456; 156/567; 156/DIG. 26

[58] Field of Search ............... 156/DIG. 26, 456, 350, 156/362, 363, 567, 447, 361, 64

[56] References Cited

U.S. PATENT DOCUMENTS 4,487,650 12/1984 Mohn et al. ......................... 156/567
4,735,664 4/1988 Asghar et al. ...................... 156/361

*Primary Examiner*—Michael W. Ball
*Assistant Examiner*—Chester T. Barry
*Attorney, Agent, or Firm*—Darby & Darby

[57] ABSTRACT

The circular platform of a rotary bottle labeler comprises a plurality of pedestals (2) ranged around its periphery, rotatable about respective vertical axes; each pedestal shaft is connected to a stepping motor (1) and rotated through a given angle calculated by a microprocessor, this in turn in receipt of the output signal from a pulse generator (21) which is driven by the platform and serves to establish the angular position of the pedestals in relation to the axis of the platform. Pulses emitted by the generator are received and counted by the microprocessor, which is programmed to pilot rotation of the stepping motor, hence of the pedestal, in such a way that the bottle above is moved into a prescribed angular position in readiness to receive its label.

3 Claims, 2 Drawing Sheets

DEVICE FOR ROTATION OF THE PEDESTALS SUPPORTING BOTTLES, OR CONTAINERS IN GENERAL, IN ROTARY LABELING MACHINES

BACKGROUND OF THE INVENTION

The present invention relates to rotary type bottle labeling machinery, and concerns a device for rotation of the pedestals by which single bottles, or containers generally, are supported during the labeling operations.

High production labeling machines are embodied in most instances as a rotating platform or carrousel, the periphery of which affords a plurality of stands, or pedestals, on which the containers for labeling are positioned.

In the course of its rotation, the platform passes in front of one or more labeling stations at which labels taken from a magazine are spread with glue and transferred singly to the bottles.

The pedestals, to which the bottles are transferred by star wheel conveying devices of conventional type, are capable of rotation about their own axes for the reason that with several types of container (for example champagne bottles), the label has to be aligned with a previously positioned capsule a foil seal over the cap and upper neck portion of the bottle). More exactly, the label has to be applied to the container in a predetermined position with respect to another part or mark, for example the capsule in the case of a champagne bottle.

The prior art embraces two methods of aligning a bottle with the label it is to receive: in a first, the bottles, rotating about their own axes, are aligned at the moment of their passage through the star wheel that conveys them onto the carrousel; in this instance, alignment is brought about by means of a system of photocells and clutch or caliper means that cause rotational movement of the bottles to cease on arrival at a given angular position. The drawback with this system is that the passage from the star wheel device to the labeling pedestal occurs without the bottle being held or clamped, the result of which is that it remains free to rotate about its own axis, and alignment cannot therefore be guaranteed.

The second method mentioned is one of aligning the bottle directly on the pedestal. To this purpose, use is made of cam-operated brake-clutch devices mounted beneath the pedestal, which operate on the cam controlling rotation.

More exactly, the cam is permanently driven by the clutch, whereas the brake is applied only when triggered by a photocell that verifies alignment. Neither do these brake-clutch clamp devices ensure faultless alignment, particularly where different types of bottles are being handled, given that rotational inertia forces vary with the change in weight and shape of the bottle.

A further drawback is that cam or maltese cross indexing devices with brake-clutch controls of this type are unable to attain high positioning rates, with the result that the output of the labeling machine tends to be limited.

Yet another drawback of such systems is that the cam controlling rotation of the bottle remains good for one type of bottle only; thus, a change in the shape of bottle handled, or in the position of the label on the bottle, signifies a change of cam. To increase production, using prior art alignment methods, it becomes necessary to construct machines with the significantly large carrousel platforms, hence with larger proportions overall; even so, the cam problem remains unsolved, and power requirement is increased.

Accordingly, the object of the present invention is to overcome the drawbacks mentioned above, and in particular, to embody a compact labeling machine that is also universal, i.e. capable of faultlessly aligning and labeling any type of bottle without any need to change the pedestral rotation cams.

A further object of the invention is to enable change-over from one type of bottle to another without any replacement of mechanical parts, but simply by reprogramming a data processing circuit.

SUMMARY OF THE INVENTION

The stated objects and others besides are realized comprehensively with a device according to the invention for rotation of the pedestals supporting bottles, or containers generally, in rotary type labeling machine.

Such a device comprises one stepping motor for each pedestal, connected mechanically with the shaft by which the pedestal is rotated, a pulse generator operated by the revolving platform of the carrousel and designed to establish the angular position of the pedestal in relation to the axis of rotation of the platform, in terms of pulses, and a microprocessor that counts the pulses from the generator and controls the rotation of the stepping motor.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
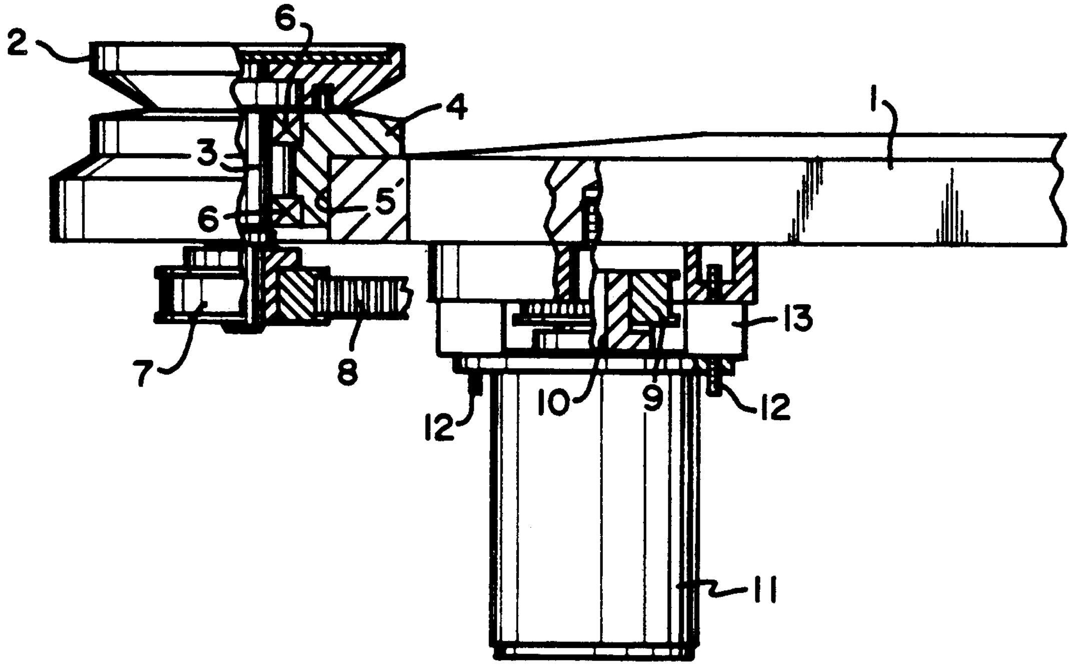
FIG. 1 is a partial cross section showing a pedestal for the support of a bottle together with its drive system.
Figure 2:
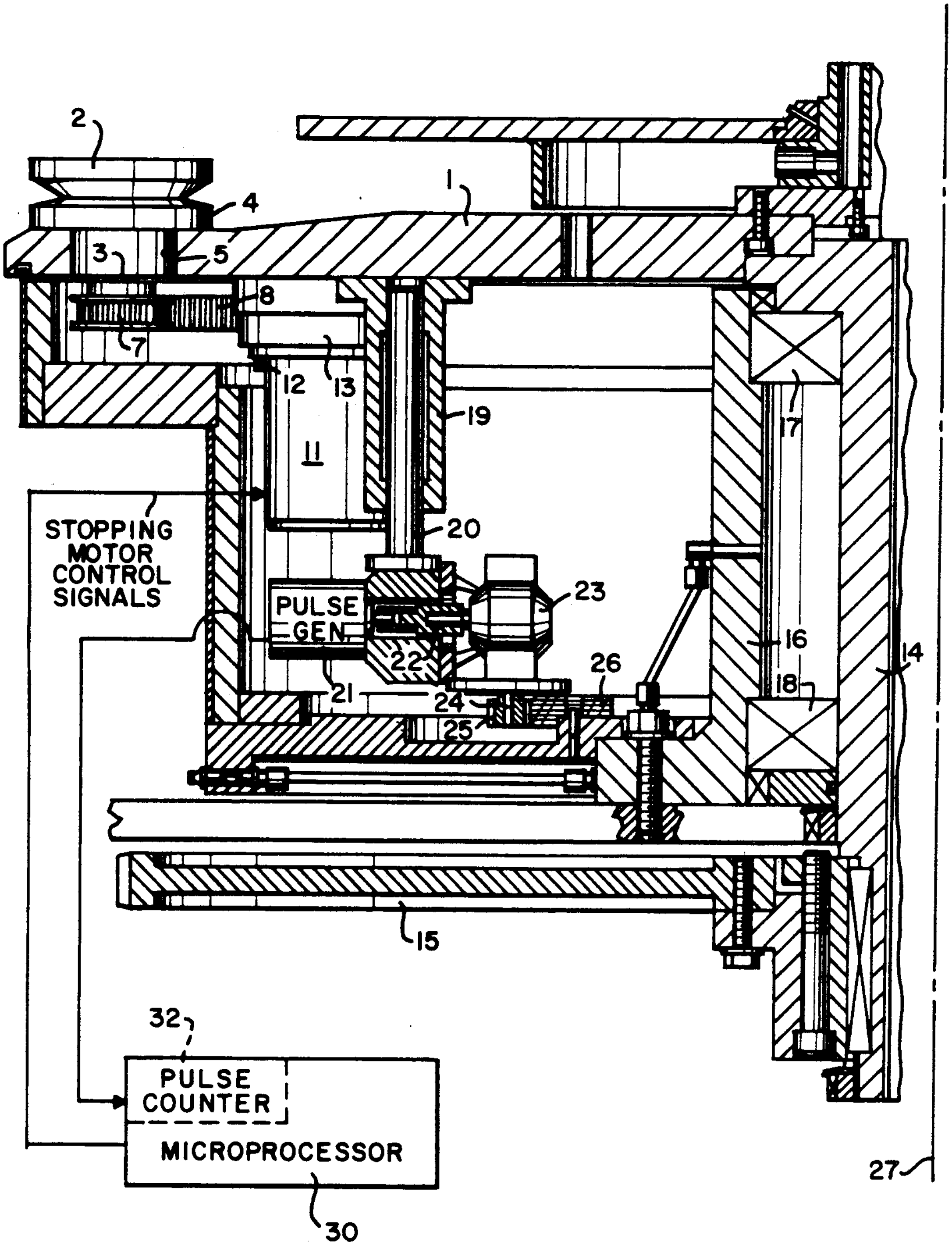
FIG. 2 provides a cross sectional view of the carrousel supporting the pedestals, illustrating the placement of a pulse generator and microprocessor.

With reference to the above drawings, 1 denotes a circular platform, or carrousel, the periphery of which exhibits a plurality of regularly spaced rotatable stands, or pedestals 2.

Each pedestal 2 is keyed to a shaft 3 supported by a bushing 4 seated in a relative hole 5 afforded by the carrousel platform. The shaft 3 turns in two bearings 6 accommodated by the bushing 4, its bottom end projecting downward and carrying a keyed timing pulley 7, about which a timing belt 8 is looped; this same belt is looped around a pulley 9 keyed to the shaft 10 of a stepping motor 11.

The stepping motor 11 is fastened to the carrousel platform by way of stud bolts 12 inserted through anti-vibration mountings 13.

The platform 1 is keyed to a hollow shaft 14 set in rotation by a gear 15, the shaft 14 supported by a hollow pillar 16 and turning in relative bearings 17 and 18.

Mounting 19 is rigidly associated with the platform and accommodates a pivot 20 for the support of a pulse generator 21, the shaft of which is connected by way of a coupling 22 to a speed reducer 23. The output shaft 24 of the speed reducer carrys a keyed gear 25 in mesh with a circular face gear 26 that is fixed to the frame of the machine. Thus, rotation of the platform 1 necessarily produces rotation of the speed reducer 23 which is fixed to the platform. Hence, the pulse generator 21 and speed reducer 23 rotate relative to the fixed gear. Engagement of the gear 25 with the fixed gear 26 causes the gear 25 to rotate the shaft 24. Therefore the pulse generator 21 emits a stream of pulses, the number of pulses being proportionate to the angular position of the platform 1 in relation to its own axis 27 of rotation. The pulse signals from the pulse generator 21 are relayed to a microprocessor 30, which incorporates a pulse counting capability 32, that counts the pulses from the pulse generator 21. According to the angular position of the carrousel, and therefore of the pedestals 2 mounted on the carrousel, the microprocess instructs the motors 11, respectively to execute a given number of steps as determined from the pulses.

The number of steps accomplished by the motor must be programmed on the basis of the type of bottle, and of its alignment with a given reference, for example, a capsule already applied to the bottle. With a device thus embodied, users simply program the microprocessor with information representative of the angular position that the bottle must occupy in relation to a given reference, or of the shape of the bottle itself, whereupon positioning will be executed faultlessly during the different labeling machine cycles.

A labeling machine fitted with the device disclosed will be seen to be universal, since no replacement of mechanical parts is required in order to enable the handling of different types of container.

What is claimed:

1. A device in a rotary type labeling machine having a fixed frame, said device being for rotation of pedestals for supporting containers to be labeled, comprising:

a rotatable carrousel platform, the periphery of said platform including a plurality of pedestals, each pedestal being rotatable on a respective pedestal shaft about a respective vertical axis;

a plurality of stepping motors, each stepping motor being connected to each said respective pedestal shaft for rotating the respective pedestal;

a pulse generator, connected to said platform to output pulses in response to platform rotation;

a microprocessor for receiving and counting said pulses emitted by said pulse generator, said microprocessor serving to establish in terms of total pulses the angular position of said pedestals in relation to the axis of rotation of the carrousel and controlling rotation of said stepping motors, respectively, to rotate said pedestals about said pedestal axes response to with said counted pulses.

2. A device as in claim 1, wherein said microprocessor is programmable to determine the number of steps that must be effected by the stepping motors, respectively, in operation of said rotary type labeling machines in response to said total pulses received from said pulse generator for positioning of said containers having different shapes.

3. A device as in claim 1, and further comprising a speed reducer moving with said platform, and a circular face gear rigidly associated with said frame of said labeling machine, said pulse generator being linked to an output of said speed reducer, said circular face gear driving said speed reducer.

* * * * *